July 12, 1932.   M. C. WILEY   1,867,126
SEPARABLE FASTENER
Filed May 10, 1930
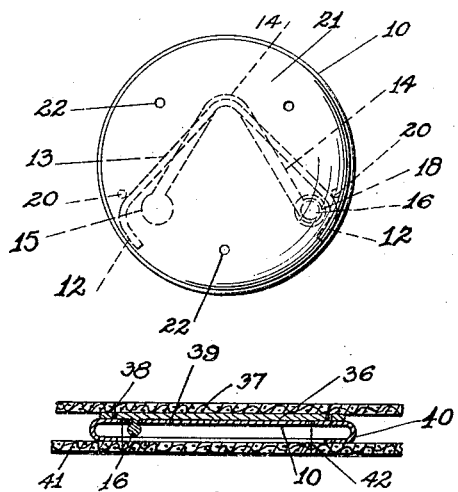
Fig. 1.
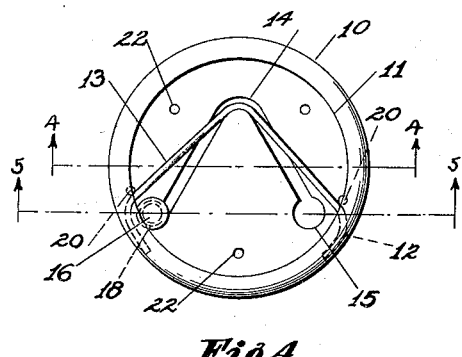
Fig. 2.
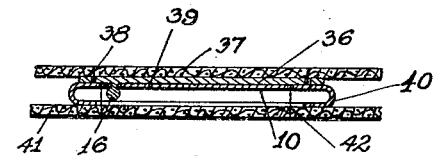
Fig. 3.
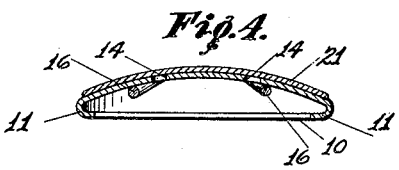
Fig. 4.
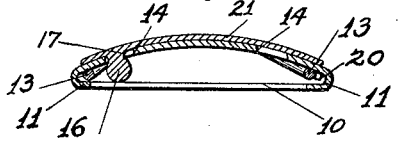
Fig. 5.
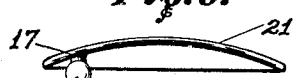
Fig. 6.
Fig. 9.
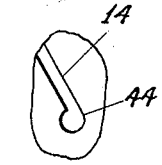
Fig. 10.
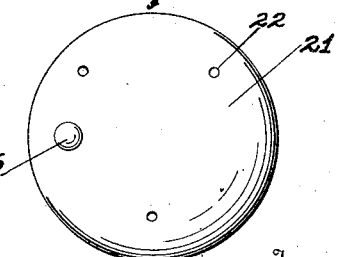
Fig. 7.
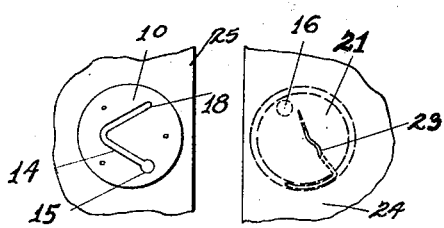
Fig. 8.
Fig. 11.
Inventor
Margaret Crosson Wiley
By Emery, Booth, Varney & Holcombe
Her Attorneys Patented July 12, 1932

1,867,126

UNITED STATES PATENT OFFICE

MARGARET CROSSON WILEY, OF WASHINGTON, DISTRICT OF COLUMBIA

SEPARABLE FASTENER

Application filed May 10, 1930. Serial No. 451,385.

This invention relates to separable fasteners of the type embodying a stud member and a slotted member, and aims to provide a fastener that will not become disengaged accidentally.

Another object is to provide a fastener that will not disengage as a result of direct pulling action, but that will remain in the engaged position until detached by a simple reciprocating motion.

A further object is to provide a fastener that can be manufactured and assembled at a low cost, particularly in the smaller sizes.

While the preferred embodiment of the invention described and claimed herein, shows a fastener designed specifically for use on apparel or upholstery, it is obvious that its scope is not limited thereto, but extends to a variety of uses that readily suggest themselves.

In the drawing:

Fig. 1 shows a top plan view of the assembled members of the fastener in the engaged position;

Fig. 2 shows a bottom plan view of the same members;

Fig. 3 is a cross-section of the attached members in a modified form with the spring not shown for the sake of clearness;

Fig. 4 is a cross-section on the line 4—4 in Fig. 2;

Fig. 5 is a cross-section on the line 5—5 in Fig. 2;

Fig. 6 is a side elevation of the stud member;

Fig. 7 is a bottom plan view of the stud member;

Fig. 8 shows a modification of the slotted member in triangular shape provided with an integrally formed folding attaching leaf; the spring member being omitted;

Figs. 9 and 10 show modifications of the offset at the terminal end of the slot; and Fig. 11 shows a diagrammatic representation of the attaching position of the two fastener members on the two parts of the material, together with a modification showing the stud member provided with pin-attaching means for use as a fastener for upholstery covers.

The slotted member 10 shown in the drawing is stamped out of sheet metal so as to provide a convex face and a turned under bead or lip 11 designed to receive the inwardly bent ends 12 of the wire spring 13. Out of the convex face of the base 10 is cut an angular slot 14 of the keyhole type substantially in the form of an inverted V. At the entrance end of this slot is the opening 15 to admit the stud 16 carried on the other fastener member so that the neck 17 of the stud 16 slides in the slot 14 to its terminal 18.

The wire spring 13 is held in position on the under side of the slotted member 10 by means of the feet 12 held in sliding engagement by the curved lip 11. The divergence of the ends of the spring is restricted by limiting means such as the ears 20 struck up out of the edge of the base 10. The spring shown in the drawing is so positioned that it will approximately follow the curvature of the inner edge of the slot 14 at its apex. This permits the portion of the spring 13 at the vicinity of the apex of the slot 14 to bear against the neck 17 of the stud 16 as it moves through the slot 14 during engagement, and also prevents the stud 16 from working itself over the apex after the fastener has been engaged. The stud fastening member is formed of a base 21, preferably of sheet metal with the stud 16 positioned thereon so that the base 21 of the stud member will fit over the base 10 of the slotted member when the two members are in engaged position. One or both of the members could be made flat, or the stud member could be made concave or convex, without departing from the scope of this invention. The stud 16 could be positioned at any point on the base 21 as required by various circumstances of use. If desirable the base 21 could also be provided with the usual beaded edge. The fastener members can be sewed onto the material by means of the usual holes 22 in the bases 10 and 21, or attached by any other means well known in the art. A modification of the attaching means is shown in Fig. 11, in which the stud member is formed with an imperforate base 21 provided with pin-attaching means 23 for use as a fastener for upholstery covers. This may be pinned through the under side of the upholstery material 24 in position to engage the slot member 10 secured to the under side of the upholstery cover 25, or vice versa.

A further modification of the attaching means is shown in Fig. 8 comprising a triangular base 31 having an integrally formed leaf 32, from which is struck up prongs 33. These prongs pass through the material to which the fastener is to be attached and engage the holes 34 in the base after the attaching leaf 32 is bent on the median line 35 over the edge of the material gripping it in the fold formed by the base 31 with the leaf 32. It is contemplated that either or both fastener members could be made with these auxiliary attaching means.

Fig. 3 shows another modification comprising a flush type concealed fastener. The flat stud member 36 is shown attached to the material 37 by the thread 38. In engagement with the stud member 36 is the slotted member 39 formed with a flat face and with beaded edge 40. This slotted member is attached to the material 41 by means of the thread 42.

In some uses it is desirable to provide the slot 14 with an offset seat 43 at its terminal end as shown in Fig. 9. This offset can take the form there shown or can consist of a circular offset 44 as shown in Fig. 10, placed either to the left or the right of the terminal end of the slot 14.

The preferred position for attaching the fastener members to the two parts 24 and 25 of the material to be joined by the fastener is shown in Fig. 11 and it is contemplated that the relative position of the two members can be adjusted to conform with conditions of use.

To engage the fastener the stud 16 is inserted in the opening 15 of the slot 14 and forced with a simple reciprocating motion against and past the spring 13 at the apex of the slot and down into the terminal end 18 of the slot 14. The tension between the two fastener members tends to hold the neck 17 of the stud 16 in the terminal end of the slot. If any accidental force should be applied that would tend to cause the stud 16 to slide toward the apex of the slot 14, this force would be directed by the slot in a direction approximately opposite to the force of the tension tending to hold the two fastener members in engagement.

This invention takes advantage of this tension by placing the slot 14 substantially in the position of an inverted V when viewed from the attaching position of the stud member as shown in Fig. 11.

It is clear that, should the stud 16 be accidentally forced to the apex of the slot 14, the spring 13 would, at this point, prevent the stud from accidentally working over the apex of the slot 14 and becoming disengaged at the opening 15.

To disengage the two members of the fastener the simple reciprocating motion previously described is reversed and the opening 15 allows the head 16 of the stud to be withdrawn and the fastener members separated.

When used as an upholstery fastener, a preferred form of which is shown in Fig. 11, the stud member 21 is attached to the upholstery so that the stud will assume approximately the position shown therein. The slotted member 10 is attached in such a way that its slot will assume in relation to the stud member the position shown in Fig. 11.

To engage the fastener members in this form the opening 15 is placed over the head of the stud 16 so that the neck 17 can engage the slot 14. The slotted member 10 is then engaged by sliding it over the stud 16 until the head is seated in its terminal end 18.

Having herein described a preferred embodiment of the invention, it is expressly stated that this embodiment is illustrative only, and that the invention is not limited to the materials, dimensions, and specific elements described, but comprises all equivalents of the several cooperating features herein shown and described.

What is desired to be secured by Letters Patent is as follows:

1. A separable fastener comprising a stud member and a slotted member having a key hole slot substantially in the form of an inverted V whose one entrance end is enlarged to admit the head of said stud so that the reduced neck portion of said stud may be held in sliding engagement by the remaining portion of said slot, said slotted member being provided with an angular spring member whose apex is adapted and positioned to resiliently impede the manipulation of said stud over the apex of said slot, to prevent its accidental passage therefrom and to confine said stud in the unenlarged end portion of said slot.

2. A separable fastener comprising a stud-bearing member, and a slotted member having a key hole slot substantially in the form of an inverted V whose one entrance end is enlarged to admit the head of said stud so that the reduced neck portion of said stud may be held in sliding engagement by the remaining portion of said slot; a spring substantially in the form of an inverted V so cooperating with said slotted member that the apex portion of said spring will resiliently contact and impede the neck of said stud as it is manually forced to slide over the apex of said slot and under the apex of said spring, said spring being adapted to confine said stud in the un-enlarged end portion of said slot and to prevent the accidental passage of said stud over the apex of said slot.

3. A separable fastener comprising a stud-bearing member and a slotted member having a key hole slot substantially in the form of an inverted V whose one entrance end is enlarged to admit the head of said stud so that the reduced neck portion of said stud may be held in sliding engagement by the remaining portion of said slot; a spring substantially in the form of an inverted V whose legs are held in sliding engagement with, and whose divergence is limited by said slotted member, said spring being so associated with said slotted member that the apex portion of said spring will resiliently contact and impede the neck of said stud as it is manually forced to slide over the apex of said slot and under the apex of said spring, said spring being adapted to confine said stud in the un-enlarged terminal portion of said slot and to prevent the accidental passage of said stud over the apex of said slot.

4. A separable fastener comprising a stud member and a slotted member having a key hole slot substantially in the form of an inverted V whose one entrance end is enlarged to admit the head of said stud, the remaining portion of the slot including the other end thereof being comparatively narrow so that the reduced neck portion of said stud may be held in sliding engagement by the remaining portion of said slot; said slotted member being provided with a spring member having a portion thereof positioned adjacent to the apex of said slot to resiliently impede the manipulation of said stud over the apex of said slot, to prevent its accidental passage thereover, and to confine said stud in the un-enlarged end portion of said slot.

In testimony whereof, I have signed my name to this specification.

MARGARET CROSSON WILEY.